United States Patent [19]

Goto et al.

[11] 4,175,533
[45] Nov. 27, 1979

[54] INTERNAL COMBUSTION ENGINE WITH AN AUXILIARY COMBUSTION CHAMBER

[75] Inventors: Kenji Goto; Masato Yokota; Hideo Kobayashi, all of Susono, Japan

[73] Assignee: Toyota Jidosha Kogyo Kabushiki Kaisha, Toyota, Japan

[21] Appl. No.: 848,759

[22] Filed: Nov. 4, 1977

[30] Foreign Application Priority Data

May 20, 1977 [JP] Japan .................................. 52-57559

[51] Int. Cl.² ............................................ F02B 23/00
[52] U.S. Cl. .............................. 123/191 S; 123/32 B; 123/193 H; 123/193 P
[58] Field of Search ............ 123/32 B, 191 S, 193 H, 123/193 P, 193 CH, 32 E, 191 ST

[56] References Cited

U.S. PATENT DOCUMENTS

| | | | |
|---|---|---|---|
| 3,053,238 | 9/1962 | Meurer | 123/32 B |
| 3,980,057 | 9/1976 | Sanda | 123/32 SP |
| 4,108,133 | 8/1978 | Konishi | 123/191 SP |
| 4,128,092 | 12/1978 | Yokota | 123/191 S |

Primary Examiner—Ronald H. Lazarus
Attorney, Agent, or Firm—Stevens, Davis, Miller & Mosher

[57] ABSTRACT

Disclosed is an internal combustion engine comprising a main combustion chamber and an auxiliary combustion chamber which are interconnected to each other via a connecting passage. The opening of the connecting passage is arranged to be directed to the central portion of the piston when the piston reaches the top dead center. The combustible mixture in the auxiliary combustion chamber is ignited. As a result, a burning jet is injected into the main combustion chamber. An additional auxiliary combustion chamber having no spark plug therein is formed in the piston. The additional auxiliary chamber opens onto the central portion of the top face of the piston. The combustible mixture in the additional auxiliary combustion chamber is ignited into an explosion by the burning jet injected from the connecting passage.

8 Claims, 14 Drawing Figures

INTERNAL COMBUSTION ENGINE WITH AN AUXILIARY COMBUSTION CHAMBER

DESCRIPTION OF THE INVENTION

The present invention relates to an internal combustion engine with an auxiliary combustion chamber.

As a method for simultaneously reducing an amount of harmful HC, CO and $NO_X$ components in the exhaust gas and for improving fuel consumption, a method of using a lean air-fuel mixture is known. On the other hand, as a method for reducing an amount of harmful $NO_X$ components in the exhaust gas, a method of recirculating a large amount of exhaust gas into the intake system of the engine is known. However, if a lean air-fuel mixture or a mixture containing a large amount of the recirculated exhaust gas therein is used in an ordinary engine, a stable ignition and combustion cannot be obtained. As a result of this, since the length of time of the combustion is increased; in addition, since the fluctuations of the combustion are increased, the operation of the engine actually becomes impossible.

On the other hand, as an internal combustion engine capable of using a lean air-fuel mixture or a mixture containing a large amount of the recirculated exhaust gas therein, an engine has been proposed in which the combustion chamber comprises a main combustion chamber and an auxiliary combustion chamber which are interconnected to each other via a connecting passage. In the engine provided with an auxiliary combustion chamber of this type, by causing the ignition of the combustible mixture to occur in the main combustion chamber due to the burning jet injected from the auxiliary combustion chamber, the ignition and the combustion are stabilized; in addition, the speed of the combustion is quickend. However, in such an engine, a satisfactory high speed of the combustion cannot be obtained. As one of the methods for quickening the speed of the combustion, there is a method for increasing the volume of the auxiliary combustion chamber for obtaining a strong burning jet. However, in this method, the speed of the combustion is reduced in the latter half of the combustion period. As a result, it is impossible to sufficiently quicken the speed of the combustion. In addition, if the volume of the auxiliary combustion chamber is increased as mentioned above, the velocity of the combustible mixture flowing in the connecting passage communicating the main combustion chamber with the auxiliary combustion chamber at the time of the compression stroke will be extremely increased. As a result of this, if the spark gap of a spark plug is located in the connecting passage, a problem will occur in which the discharging arc formed in the spark gap is extinguished.

An object of the present invention is to provide an internal combustion engine provided with an auxiliary combustion chamber, which is capable of obtaining a stable ignition and combustion, and which is also capable of quickening the speed of the combustion even if a lean air-fuel mixture or a mixture containing a large amount of recirculated exhaust gas therein is used.

According to the present invention, there is provided an internal combustion engine comprising:

a cylinder block having a cylinder bore therein;

a cylinder head mounted on the cylinder block and having therein a cavity for defining a first auxiliary combustion chamber;

a piston reciprocally moving in the cylinder bore and having a top face, which piston and the cylinder head forming a main combustion chamber therebetween;

at least one connecting passage communicating the main combustion chamber with the first auxiliary combustion chamber and having an opening which is arranged to be directed to the central portion of the top face of the piston when the piston reaches the top dead center;

an intake valve mounted on the cylinder head for leading a combustible mixture into the main combustion chamber;

an exhaust valve mounted on the cylinder head for discharging an exhaust gas into the atmosphere;

an ignition means for igniting the combustible mixture in the first auxiliary combustion chamber;

a second auxiliary combustion chamber formed in the piston, and;

a connecting means communicating the main combustion chamber with the second auxiliary combustion chamber and having at least one opening which opens onto the central portion of the top face of the piston.

The present invention may be more fully understood from the following description of the preferred embodiments of the invention, together with the accompanying drawings. BRIEF DESCRIPTION OF THE DRAWINGS In the drawings.

DESCRIPTION OF PREFERRED EMBODIMENTS

Figure 1:
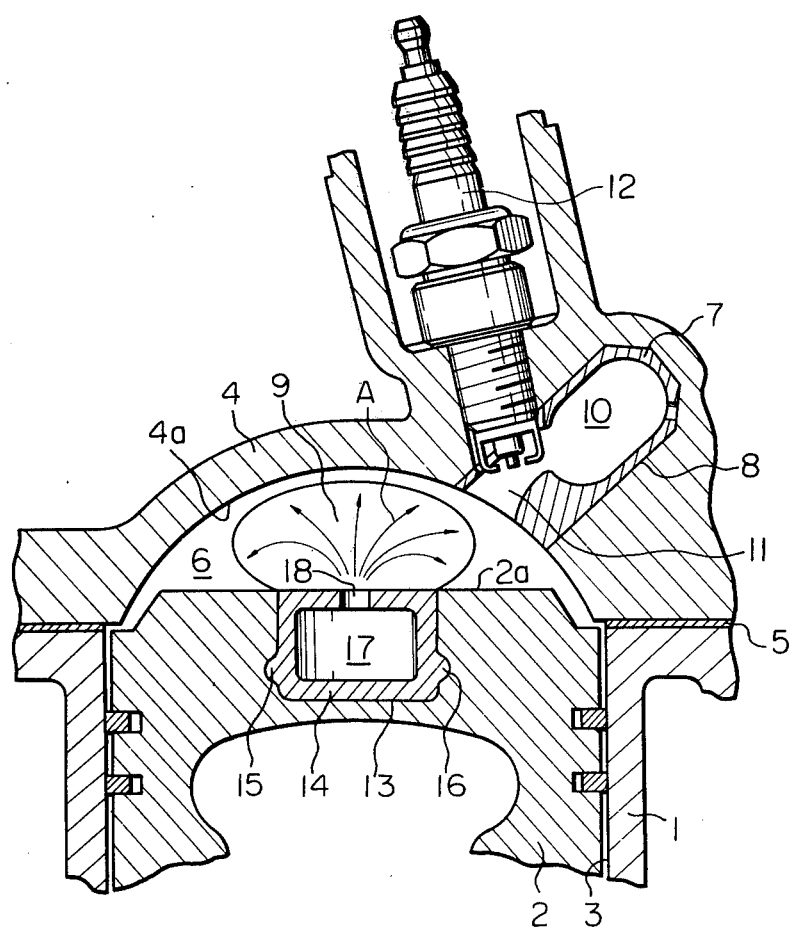
FIG. 1 is a cross-sectional side view of an embodiment of an internal combustion engine according to the present invention.
Figure 2:
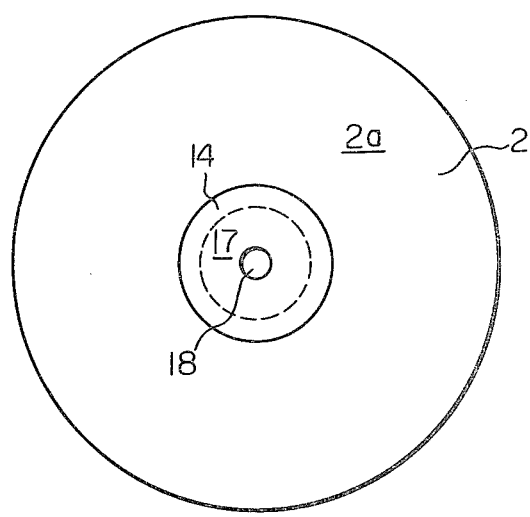
FIG. 2 is a plan view of the piston shown in FIG. 1.

Referring to FIG. 1, 1 designates a cylinder block, 2 a piston having a flat top face 2a and reciprocally moving in a cylinder bore 3; 4 a cylinder head having a semi-spherical inner wall 4a and being fixed onto the cylinder block 1 via a gasket 5; 6 a main combustion chamber formed between the top face 2a of the piston 2 and the inner wall 4a of the cylinder head 4, 7 an auxiliary chamber component press-fitted into a recess 8 formed in the cylinder head 4, and 9 an intake valve. A first auxiliary combustion chamber 10 and a first connecting passage 11 communicating the first auxiliary combustion chamber 10 with the main combustion chamber 6 are formed in the auxiliary chamber component 7. FIG. 1 shows the case wherein a single first connecting passage 11 is provided. However, one or more additional first connecting passages may be provided in addition to the first connecting passage 11. In the embodiment shown in FIG. 1, the electrode of a spark plug 12 is located in the first connecting passage 11. However, instead of positioning the electrode of the spark plug 12 in the first connecting passage 11, the spark plug 12 may be arranged so that its spark gap is located in some other place for example, within the first auxiliary combustion chamber 10 or within the main combustion chamber 6 at a position located near the first connecting passage 11. The first connecting passage 11 is so arranged that its opening is directed to the central portion of the top face 2a of the piston 2 when the piston 2 reaches the top dead center as shown in FIG. 1.

On the other hand, a recess 13 is formed on the top face 2a of the piston 2, and a hollow vessel 14 is disposed in the recess 13. This hollow vessel 14 is embedded into the piston 2 when the piston 2 is moulded by a casting operation. It is preferable that the hollow vessel 14 be made of a heat resistable alloy such as stainless steel or made of ceramics such as silicon nitride $Si_3N_4$. In addition, it is preferable that the hollow vessel 14 be provided with projections 15 and 16 which are used for preventing the hollow vessel 14 from being dislodged from the recess 13. A second auxiliary combustion chamber 17 and a second connecting passage 18 communicating the second auxiliary combustion chamber 17 with the main combustion chamber 6 are formed in the hollow vessel 14. As is shown in FIG. 1, the second connecting passage 18 is arranged coaxially with the axis of the piston 2 and has a uniform cross-section over the entire length thereof.

In operation, at the time of the intake stroke, a lean air-fuel mixture or a mixture containing a large amount of the recirculated exhaust gas therein is introduced into the main combustion chamber 6 via the intake valve 9. At this time, since the combustible mixture flows along the semi-spherical inner wall 4a of the cylinder head 4, a part of the residual exhaust gas remaining in the first auxiliary combustion chamber 10 is sucked out into the main combustion chamber 6 due to the ejector effect. On the other hand, at the time of the intake stroke, since the combustible mixture stream flowing along the top face 2a of the piston 2 does not occur, the high temperature residual exhaust gas created by the combustion in the preceding cycle and remaining in the second auxiliary combustion 17 continues to remain in the second auxiliary combustion chamber 17 without being sucked out into the main combustion chamber 6. Then, at the time of the compression stroke, the combustible mixture in the main combustion chamber 6 is forced into the first auxiliary combustion chamber 10 via the first connecting passage 11 on one hand, and into the second auxiliary combustion chamber 17 via the second connecting passage 18 on the other hand. As is shown in FIG. 1, the first connecting passage 11 is arranged so as to be tangentially connected to the inner wall of the first auxiliary combustion chamber 10. Consequently, the combustible mixture forced into the first auxiliary combustion chamber 10 via the first connecting passage 11 is caused to create a strong swirl motion in the first auxiliary combustion chamber 10. On the other hand, the residual exhaust gas remaining around the electrode of the spark plug 12 is completely scavenged by the combustible mixture forced into the first auxiliary combustion chamber 10 from the main combustion chamber 6.

As a result, the combustible mixture is easily ignited by the spark plug 12. Since a strong swirl motion is created in the first auxiliary combustion chamber 10 as mentioned above, the flame of the combustible mixture thus ignited spreads rapidly into the first auxiliary combustion chamber 10. Consequently, a strong burning jet is injected into the main combustion chamber 6 via the first connecting passage 11.

On the other hand, the residual exhaust gas having an extremely high temperature as hereinafter described remains in the second auxiliary combustion chamber 17. Accordingly, the combustible mixture forced into the second auxiliary combustion chamber 17 via the second connecting passage 18 at the time of the compression stroke is heated by the residual exhaust gas. Thus, the temperature of the combustible mixture is considerably increased. As a result of this, the combustible mixture becomes active and thereby generates chemically active atoms and free radicals. When the burning jet is injected from the first connecting passage 11 as mentioned previously, the combustible mixture in the main combustion chamber 6 is ignited by the burning jet. Therefore, the pressure in the main combustion chamber 6 is increased. The increase in pressure in the main combustion chamber 6 causes on increase in pressure in the second auxiliary combustion chamber 17, thereby causing the temperature of the combustible mixture in the second auxiliary combustion chamber 17 to become extremely high. As a result of this, the combustible mixture in the second auxiliary combustion chamber 17 becomes further active. When the piston 2 reaches the top dead center, and the burning jet injected from the first connecting passage 11 reaches the inside of the second auxiliary combustion chamber 17 via the second connecting passage 18, an extremely active mixture is explosively burned in the second auxiliary combustion chamber 17. In addition, this active mixture burns at a constant volume since the second connecting passage 18 has a relatively small cross-sectional area. Therefore, the pressure and the temperature of the combustible mixture in the second auxiliary combustion chamber are rapidly increased. The flame is then injected into the main combustion chamber 6 over the entire space of the main combustion chamber 8 as shown by the arrow A in FIG. 1. As a result of this, the speed of the combustion in the main combustion chamber 6, which is caused of the combustion in the latter half period, is quickened, whereby the length of time of the combustion is shortened. It is preferable that the second connecting passage 18 be positioned at a position wherein the flame injected from the second connecting passage 18 can uniformly spread over the entire space of the main combustion chamber 6. Consequently, in the case herein the main combustion chamber 6 is formed in a semi-sphere as shown in FIG. 1, it is preferable that the second connecting passage 18 be arranged on the center of the top face 2a of the piston 2. However, if the main combustion chamber is formed in any other shape, it is necessary to appropriately position the second connecting passage in accordance with the shape of the main combustion chamber.

Figure 12:
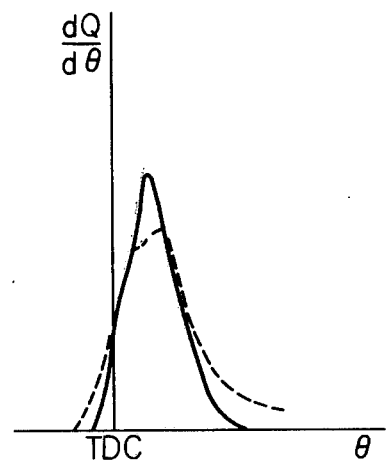
FIG. 12 is a graph showing the rate of heat release.
Figure 13:
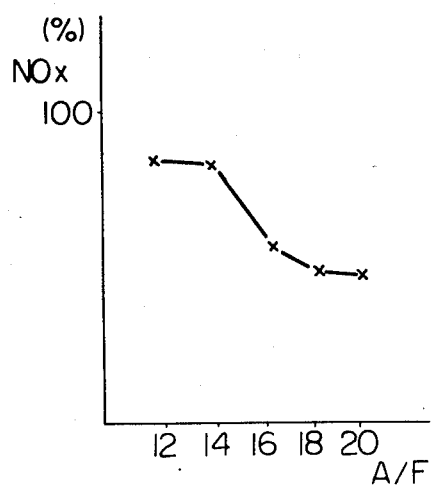
FIG. 13 is a graph showing changes in the amount of production of $NO_X$.
Figure 14:
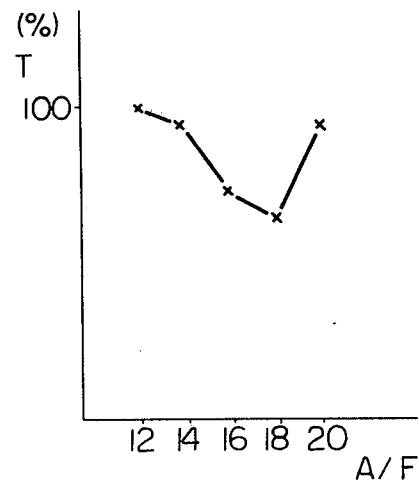
FIG. 14 is a graph showing fluctuations of the torque.

FIGS. 12 through 14 respectively the results of the experiments conducted by the inventor. The above experiments were conducted under a constant engine speed of 1600 r.p.m. by using an engine of 1600 cc. In FIG. 12, the ordinate indicates the rate of heat release $dQ/dt$, and the abscissa indicates the crank angle $\theta$. In addition, in FIG. 12, the change in the rate of the heat release in a conventional engine having no second auxiliary combustion chamber is indicated by the broken line, and the change in the rate of the heat release in an engine according to the present invention is indicated by the solid line. Referring to FIG. 12, it is understood that, in an engine according to the present invention, the speed of the combustion in the main combustion chamber is increased as compared with that in a conventional engine; as a result, the length of time of the combustion is shortened. In FIG. 13, the ordinate indicates the ratio of an amount of $NO_X$ produced in an engine according to the present invention to an amount of $NO_X$ produced in a conventional engine, and the abscissa indicates an air-fuel ratio. In FIG. 14, the ordinate indicates the ratio of a range of the fluctuations of the torque in an engine according to the present invention to a range of the fluctuation of the torque in a conventional engine, and the abscissa indicates an air-fuel ratio. In an engine according to the present invention, since the combustion gas in the main combustion chamber 6 is disturbed by the burning jet injected from the first and the second auxiliary combustion chambers 10 and 17, the temperature distribution of the gas in the main combustion chamber 6 is caused to become uniform. As a result, the amount of $NO_x$ is reduced as shown in FIG. 13. In addition, in an engine according to the present invention, since a stable ignition and combustion can be obtained, the fluctuations of the torque are reduced as shown in FIG. 14.

FIGS. 3 through 11 show various modifications of an engine according to the present invention. Accordingly, FIGS. 3 through 11 indicate only a piston, and similar components in FIGS. 3 through 11 are indicated by the same reference numerals as those shown in FIG. 1.

Figure 3:
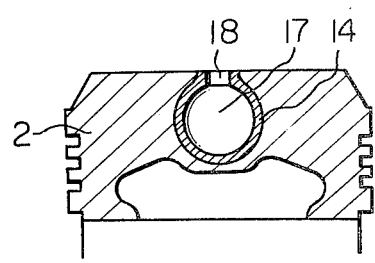
FIG. 3 is a cross-sectional side view of another embodiment of a piston.
Figure 4:
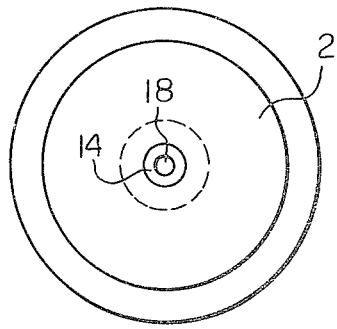
FIG. 4 is a plan view of the piston shown in FIG. 3.

In the embodiment shown in FIG. 3, the second auxiliary combustion chamber 17 is formed in a sphere which provides the most compact construction so that the speed of the combustion in the second auxiliary combustion chamber 17 is further quickened.

Figure 5:
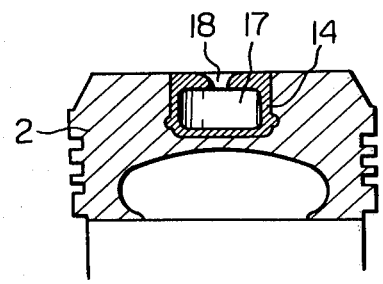
FIG. 5 is a cross-sectional side view of a further embodiment of a piston.
Figure 6:
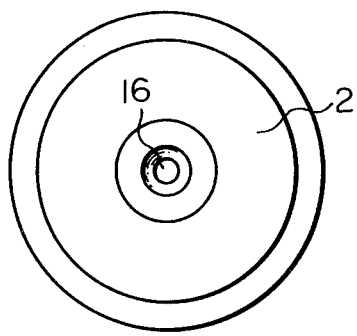
FIG. 6 is a plan view of the piston shown in FIG. 5.

In the embodiment shown in FIG. 5, the second connecting passage 18 is formed a diverging nozzle so that the flame injected from the second connecting passage 18 spreads over the entire space of the main combustion chamber.

Figure 7:
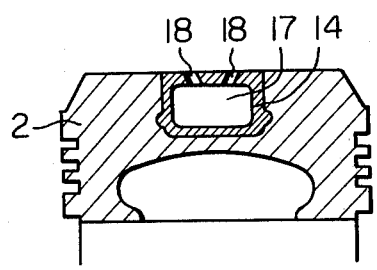
FIG. 7 is a cross-sectional side view of a still further embodiment of a piston.
Figure 8:
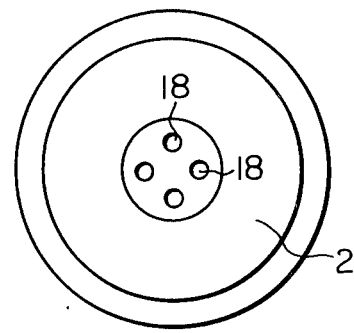
FIG. 8 is a plan view of the piston shown in FIG. 7.
Figure 9:
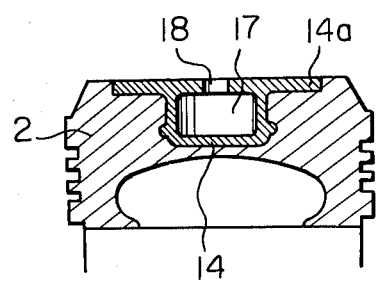
FIG. 9 is a cross-sectional side view of a still further embodiment of a piston.

In the embodiment shown in FIG. 7, a plurality of second connecting passages 18 are formed on the hollow vessel 14 so as to ensure that the burning jet reaches the second auxiliary combustion chamber 17 even if the ignition timing is varied in accordance with changes in the engine speed and load. Accordingly, the burning jet does not always reach a particular position on the top face 2a of the piston 2. In this case, since the diameter of each of the second connecting passages 18 is reduced as compared with that in the embodiment shown in FIG. 1, it should be noted that the diameter of each of the second connecting passages 18 shown in FIG. 7 is required to be set at a valve which is longer than the quench distance so that the flame is not extinguished.

In addition, in the hollow vessel 14 shown in FIG. 1, the temperature of the hollow vessel 14 located around the second connecting passage 18 becomes maximum. Consequently, in FIG. 9, the hollow vessel 14 has an extension 14a which extends along the top face 2a of the piston 2 so as to improve the radiation of heat.

Figure 10:
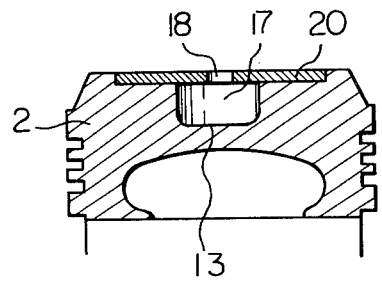
FIG. 10 is a cross-sectional side view of a still further embodiment of a piston.

In the embodiment shown in FIG. 10, the second auxiliary combustion chamber 17 is formed between the inner wall of the recess 13 and a heat resistable plate 20.

In this embodiment, since the plate 20, including a portion which defines the second connecting passage 18 and having a maximum temperature, is only made of heat resistable material, the total weight of the piston 2 can be reduced. In addition, since the piston 2 shown in FIG. 10 has a simple construction, the second auxiliary combustion chamber 17 can be easily formed by the machining operation.

Figure 11:
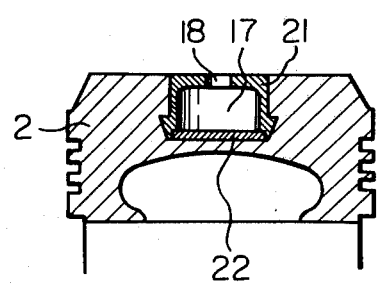
FIG. 11 is a cross-sectional side view of a still further embodiment of a piston.

In the embodiment shown in FIG. 11, the hollow vessel is formed by an upper member 21 and a lower member 22, both of which are easily formed by using the machining operation.

According to the present invention, even if a lean air-fuel mixture or a mixture containing a large amount of the recirculated exhaust gas therein is used, a stable ignition and combustion can be obtained. In addition, the speed of the combustion can be quickened. As a result of this, the fluctuations of the torque can be reduced and, in addition, the amount of harmful components, particularly of $NO_x$, in the exhaust gas can be effectively reduced.

While the invention has been described with reference to specific embodiments chosen for purposes of illustration, it should be apparent that numerous modifications could be made thereto by those skilled in the art without departing from the spirit and scope of the invention.

What is claimed is:

1. An internal combustion engine comprising:
    a cylinder block having a cylinder bore therein;
    a cylinder head mounted on said cylinder block and having therein a cavity for defining a first auxiliary combustion chamber;
    a piston reciprocally moving in said cylinder bore and having a top face, said piston and said cylinder head forming a main combustion chamber therebetween;
    at least one connecting passage communicating said main combustion chamber with said first auxiliary combustion chamber and having an opening which is arranged to be directed to the central portion of the top face of said piston when said piston reaches the top dead center;
    an intake valve mounted on said cylinder head for leading a combustible mixture into said main combustion chamber;
    an exhaust valve mounted on said cylinder head for discharging an exhaust gas into the atmosphere;
    an ignition means for igniting the combustible mixture in said first auxiliary combustion chamber;
    a second auxiliary combustion chamber formed in said piston, and;
    a connecting means communicating said main combustion chamber with said second auxiliary combustion chamber and having at least one opening which opens onto the central portion of the top face of said piston.

2. An internal combustion engine as claimed in claim 1, wherein said cylinder head has a semi-spherical inner wall, and said passage means comprises a single hole arranged on an axis of said piston.

3. An internal combustion engine as claimed in claim 2, wherein said hole is formed in a diverging nozzle which expands towards said main combustion chamber.

4. An internal combustion engine as claimed in claim 1, wherein said passage means comprises a plurality of holes.

5. An internal combustion engine as claimed in claim 1, wherein said second auxiliary combustion engine chamber is formed in a heat resistable hollow vessel which is rigidly fixed into a recess formed on the top face of said piston.

6. An internal combustion engine as claimed in claim 5, wherein said vessel is formed by two pieces which are made of heat resistable material.

7. An internal combustion engine as claimed in claim 1, wherein a recess is formed on the top face of said piston, said second auxiliary combustion chamber being formed between an inner wall of said recess and a heat resistable plate fixed onto the top face of said piston.

8. An internal combustion engine as claimed in claim 1, wherein said second auxiliary combustion chamber has a spherical inner wall.

* * * * *